(12) United States Patent
Chou et al.

(10) Patent No.: US 7,334,295 B2
(45) Date of Patent: Feb. 26, 2008

(54) ROTATING STRUCTURE AND ELECTRONIC DEVICE UTILIZING THE SAME

(75) Inventors: Ying-Chi Chou, Taipei (TW); Chien-Hua Sui, Hualien (TW)

(73) Assignee: BENQ Corporation, Taoyuan (TW)

( * ) Notice: Subject to any disclaimer, the term of this patent is extended or adjusted under 35 U.S.C. 154(b) by 244 days.

(21) Appl. No.: 11/027,976

(22) Filed: Jan. 4, 2005

(65) Prior Publication Data

US 2005/0189196 A1   Sep. 1, 2005

(30) Foreign Application Priority Data

Jan. 6, 2004   (TW) ............................... 93100203 A

(51) Int. Cl.
*E05D 11/00*   (2006.01)
(52) U.S. Cl. ......................................... 16/327; 16/347
(58) Field of Classification Search .................. 16/327, 16/344, 345, 347, 352, 353, 374; 361/680–682
See application file for complete search history.

(56) References Cited

U.S. PATENT DOCUMENTS

| 1,133,454 | A | * | 3/1915 | Banzett | 16/261 |
|---|---|---|---|---|---|
| 3,602,942 | A | * | 9/1971 | Neff et al. | 16/375 |
| 4,864,691 | A | * | 9/1989 | Gidseg et al. | 16/312 |
| 5,018,405 | A | * | 5/1991 | Chiu | 74/529 |
| 5,142,739 | A | * | 9/1992 | Lin | 16/326 |
| 5,500,984 | A | * | 3/1996 | Lee | 16/309 |
| 5,600,868 | A | * | 2/1997 | Tourville et al. | 16/277 |
| 6,591,453 | B2 | * | 7/2003 | Jenks | 16/353 |
| 6,789,292 | B2 | * | 9/2004 | Oshima et al. | 16/297 |
| 6,886,221 | B2 | * | 5/2005 | Minami et al. | 16/324 |
| 6,918,159 | B2 | * | 7/2005 | Choi | 16/347 |

* cited by examiner

*Primary Examiner*—Robert J. Sandy
(74) *Attorney, Agent, or Firm*—Birch, Stewart, Kolasch & Birch, LLP

(57) ABSTRACT

An electronic device and a rotating structure thereof. The rotating structure comprises a base, a shaft, a rotating assembly, and a movable assembly. The shaft comprises a first groove, and is disposed on the base. The rotating assembly comprises a second groove, and is disposed on the shaft to be rotated among a first position, a second position, and a third position. The movable assembly comprises an engaging portion, and is disposed in the shaft to be moved between a fourth position and a fifth position. The engaging portion is located in the first groove. When the movable assembly is in the fourth position, the rotating assembly is between the first position and the second position. When the movable assembly is in the fifth position, the rotating assembly can be rotated to the third position.

22 Claims, 9 Drawing Sheets

ROTATING STRUCTURE AND ELECTRONIC DEVICE UTILIZING THE SAME

BACKGROUND

The invention relates to an electronic device and a rotating structure thereof, and in particular, to an electronic device with a minimized rotating structure.

In an electronic device with a foldable support, the support is typically connected to a body of the electronic device via a rotating structure. During transportation, the support can be folded and received by means of the rotating structure so that the electronic device can be easily carried. Additionally, during operation, the support can be folded to a predetermined angle for operation by means of the rotating structure.

FIGS. 1a and 1b are schematic views of a conventional rotating structure 1 comprising a base 2, a rotary arm 3, and a movable member 4. During operation, a stopper 5 of the movable member 4 passes through a hole 2a of the base 2, and abuts a surface 6 of the rotary arm 3. Thus, the rotary arm 3 is limited to be rotated within a range θ1. To fold the support of the electronic device, the movable member 4 is moved in a direction as shown by arrow A in FIG. 1a so that the stopper 5 is separated from the hole 2a. Thus, the rotary arm 3 can be rotated within a range θ2 so that the support can be folded and received to be easily carried.

Nevertheless, the conventional rotating structure cannot be applied in an electronic device with a minimized support due to limited space. Specifically, in limited space, the conventional rotating structure may be damaged due to insufficient strength. Additionally, in the conventional rotating structure, the movable member is moved toward the outside of the rotating structure, and as such may be considered inconvenient.

Other conventional rotating structures are disclosed in Taiwan Pat. Filing No. 091205210 and Taiwan Pat. Filing No. 091205211.

SUMMARY

In view of this, an embodiment of the invention provides an electronic device with a minimized rotating structure.

An embodiment of the invention additionally provides a rotating structure with sufficient strength in a limited space.

Accordingly, an embodiment of the invention provides a rotating structure comprising a base, a fixed shaft, a rotating assembly, and a movable assembly. The fixed shaft comprises a first groove, and is disposed on the base. The rotating assembly comprises a second groove. The rotating assembly is disposed on the fixed shaft in a manner such that it is rotated among a first position, a second position, and a third position. The movable assembly is disposed in the fixed shaft to move between a fourth position and a fifth position, and comprises a first engaging portion. The first engaging portion is located in the first groove. When the movable assembly is in the fourth position, the first engaging portion is in the second groove so that the rotating assembly is limited to be rotated between the first position and the second position. When the movable assembly is in the fifth position, the first engaging portion is separated from the second groove so that the rotating assembly can be rotated to the third position.

Furthermore, the rotating assembly comprises a rotary arm and a pad. The rotary arm is disposed on the fixed shaft, and comprises a third groove and the second groove. The pad is combined with the rotary arm, and comprises a second engaging portion located in the third groove so that the pad and the rotary arm are combined together.

Additionally, the movable assembly further comprises a movable shaft, a fixed member, an elastic member, and a screw nut. The movable shaft is disposed in a through hole of the fixed shaft. The fixed member is disposed on the movable shaft. The elastic member may be a compression spring, and is disposed on the movable shaft to return the movable assembly to the fourth position. The screw nut is combined with the movable shaft to secure the fixed member on the movable shaft.

Moreover, the base comprises an opening combined with the fixed shaft. The rotating structure further comprises a stopper, an engaging member, and a rotary shaft. The stopper is disposed on the fixed shaft to limit the rotation of the rotating assembly between the first position and the third position. The engaging member is disposed on the fixed shaft and combined with the base. The rotary shaft is disposed on the base. The rotating assembly is rotated on the rotary shaft.

In another embodiment of the invention, an electronic device is provided, comprising a support, a body, and the described rotating structure. The body is combined with the rotating assembly of the rotating structure.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the subsequent detailed description and accompanying drawings, which are given by way of illustration only, and thus are not limitative of the present invention, and wherein:

FIG. 2c is an exploded view of the rotating structure in FIG. 2a;

FIG. 2e is a partial rear view of the rotating structure in FIG. 2a;

DETAILED DESCRIPTION

Figure 2A:
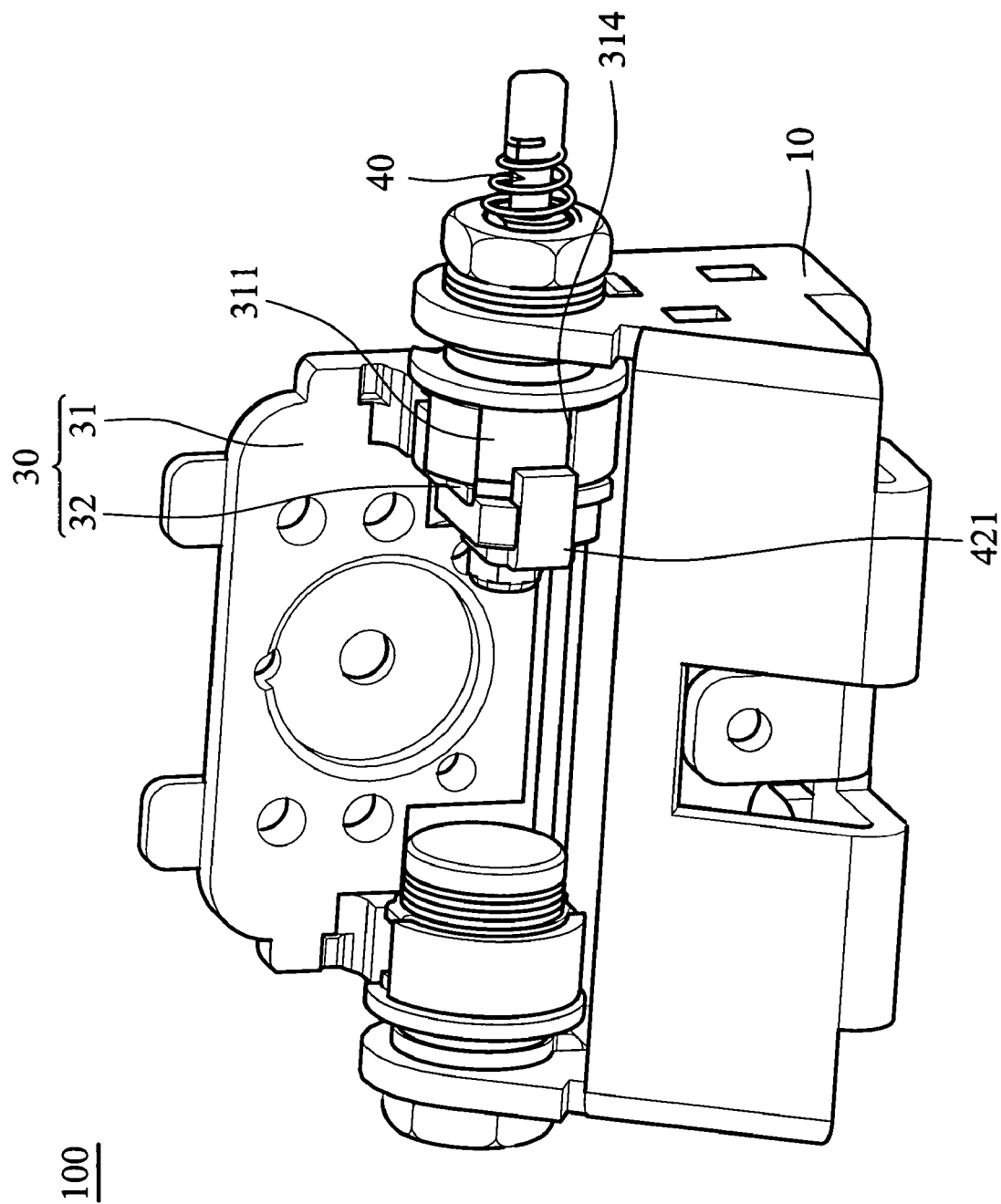
FIG. 2a is a schematic view of a rotating structure as disclosed in an embodiment of the invention, wherein a rotating assembly is located in a first position and a movable assembly is located in a fourth position.
Figure 2B:
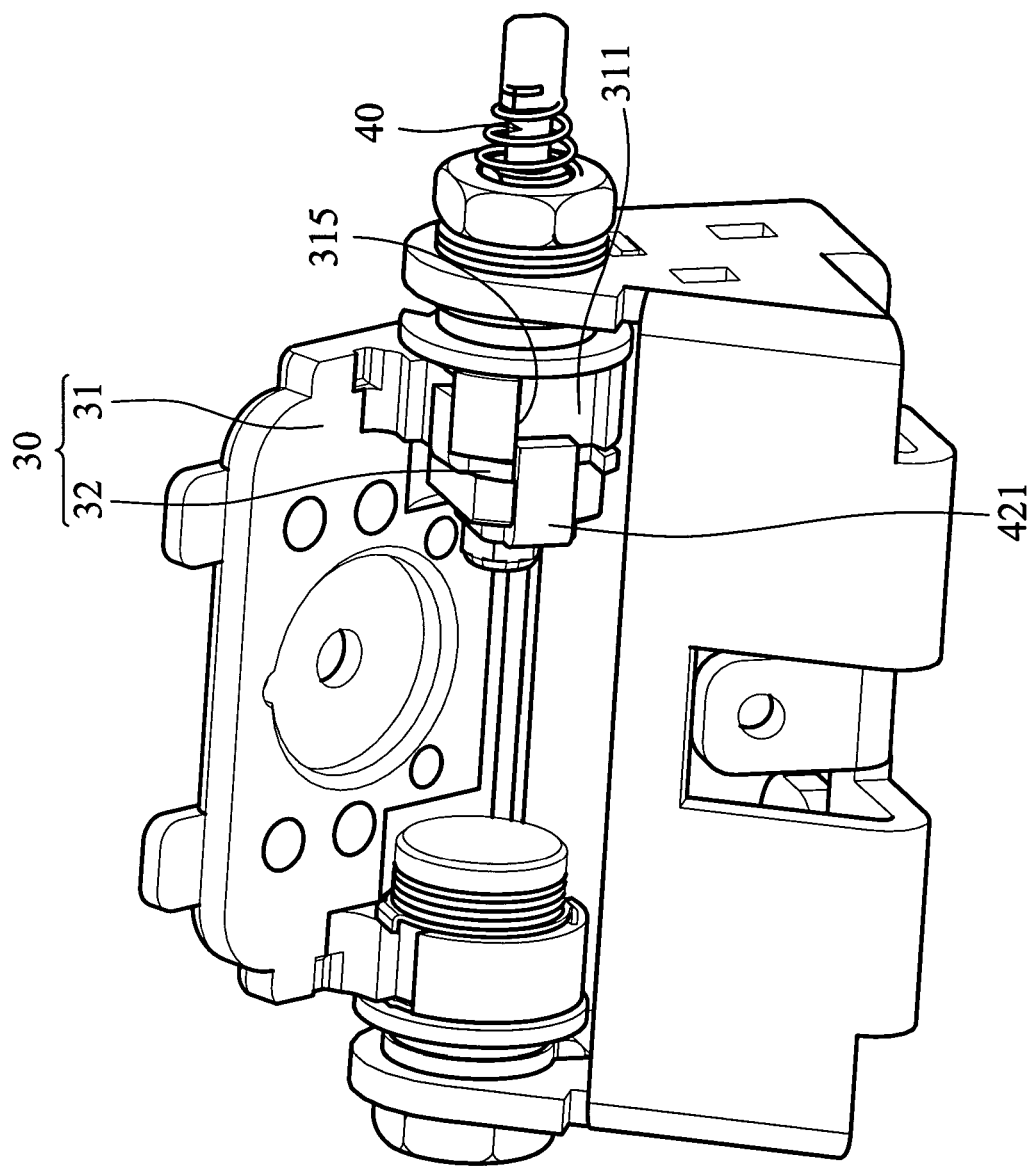
FIG. 2b is another schematic view of the rotating structure as disclosed an embodiment of in the invention, wherein the rotating assembly is located in a second position.

FIGS. 2a and 2b show a rotating structure 100 of an embodiment of the invention, comprising a base 10, a fixed shaft 20, a rotating assembly 30, a movable assembly 40, a stopper 50, an engaging member 60, a rotary shaft 70, two pads 80, and a screw 90. The base 10 is a bottom portion of the rotating structure 100, and comprises an opening 11 to combine with the fixed shaft 20.

Figure 2C:
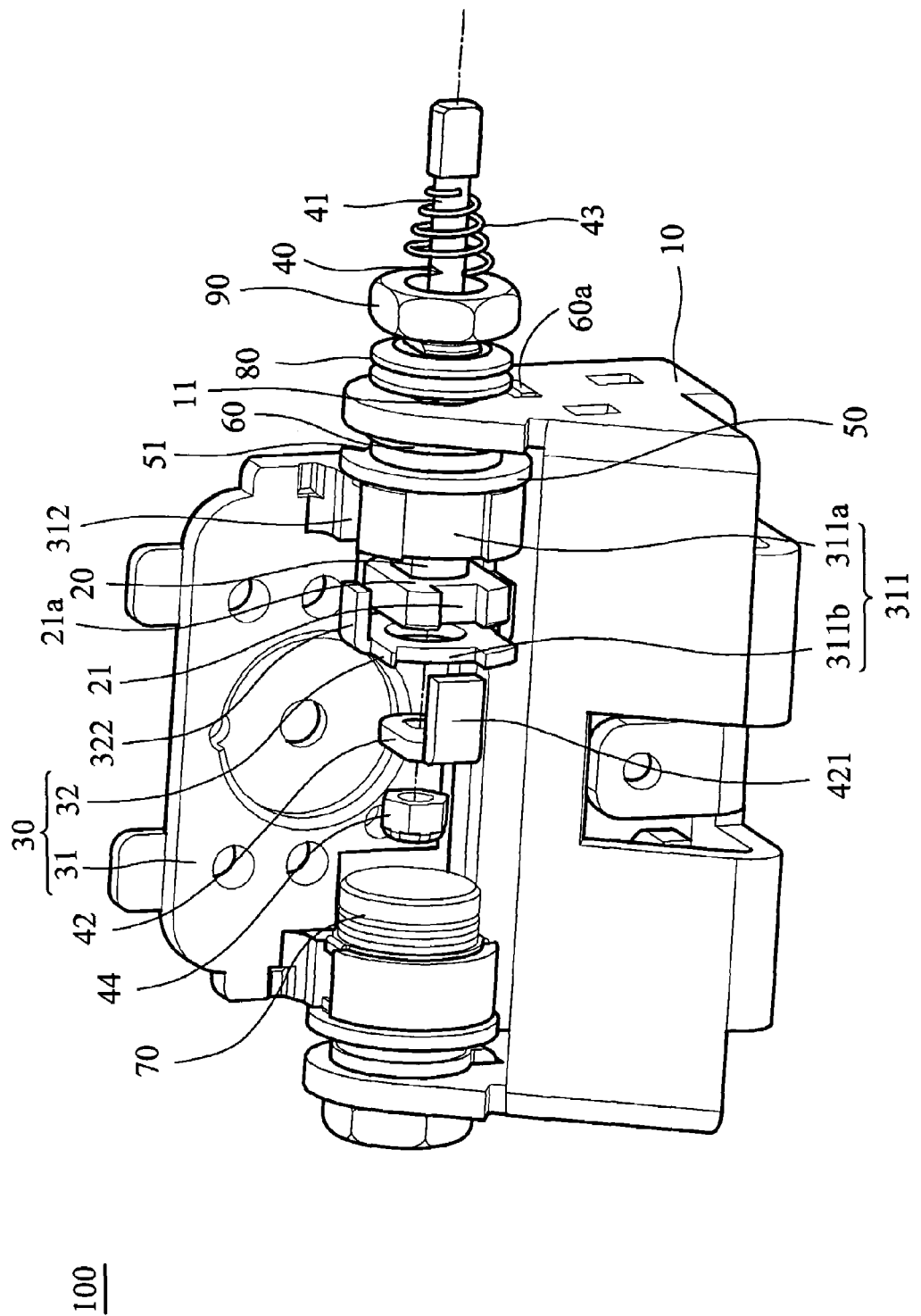
Figure 2D:
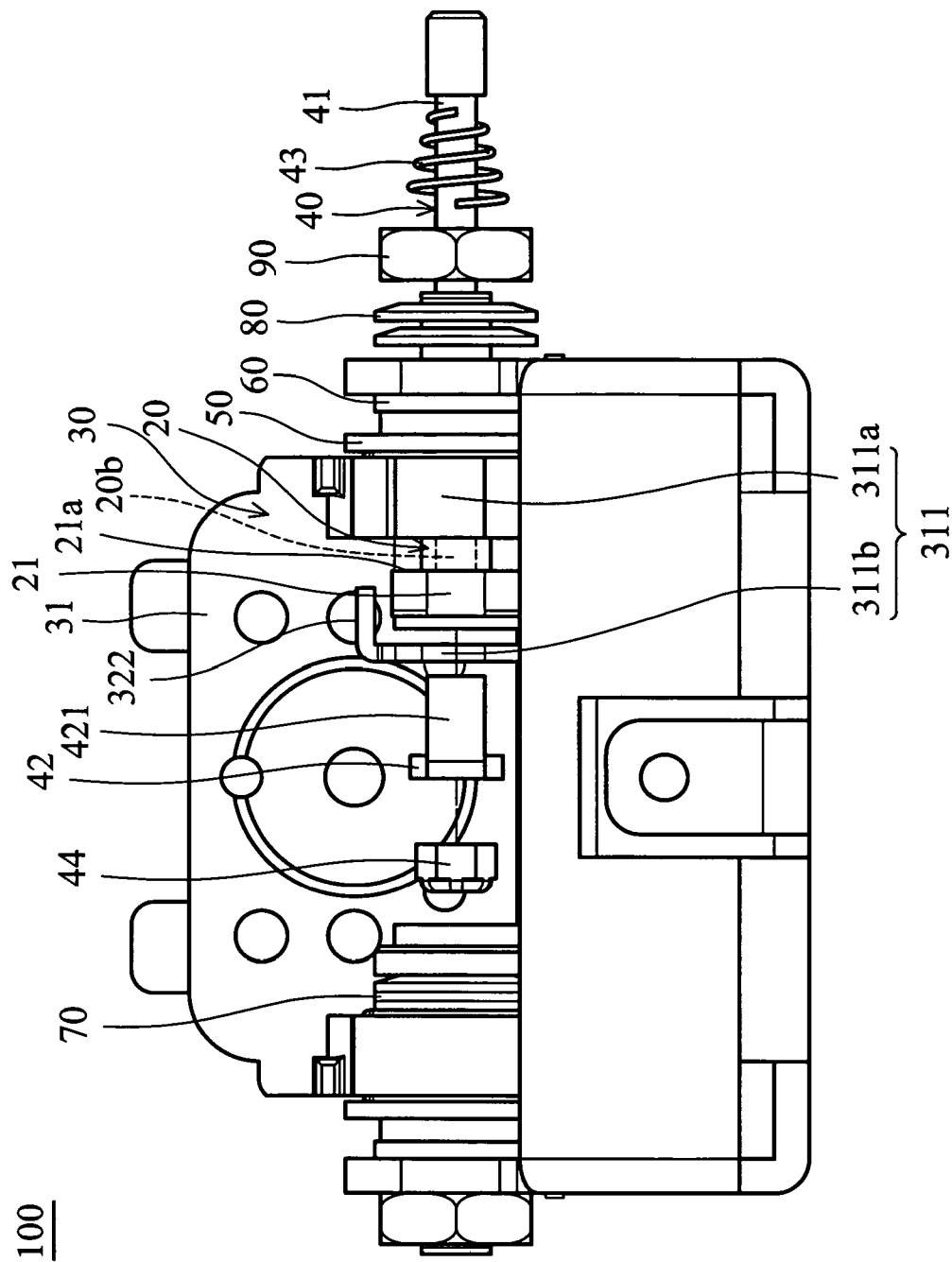
FIG. 2d is a front view of the rotating structure in FIG. 2c.

As shown in FIG. 2d, the fixed shaft 20 is combined with the base 10 via the opening 11, and comprises a through hole 20b and an integrally formed flange 21a. The flange 21a comprises a first groove 21 at one side.

Figure 3A:
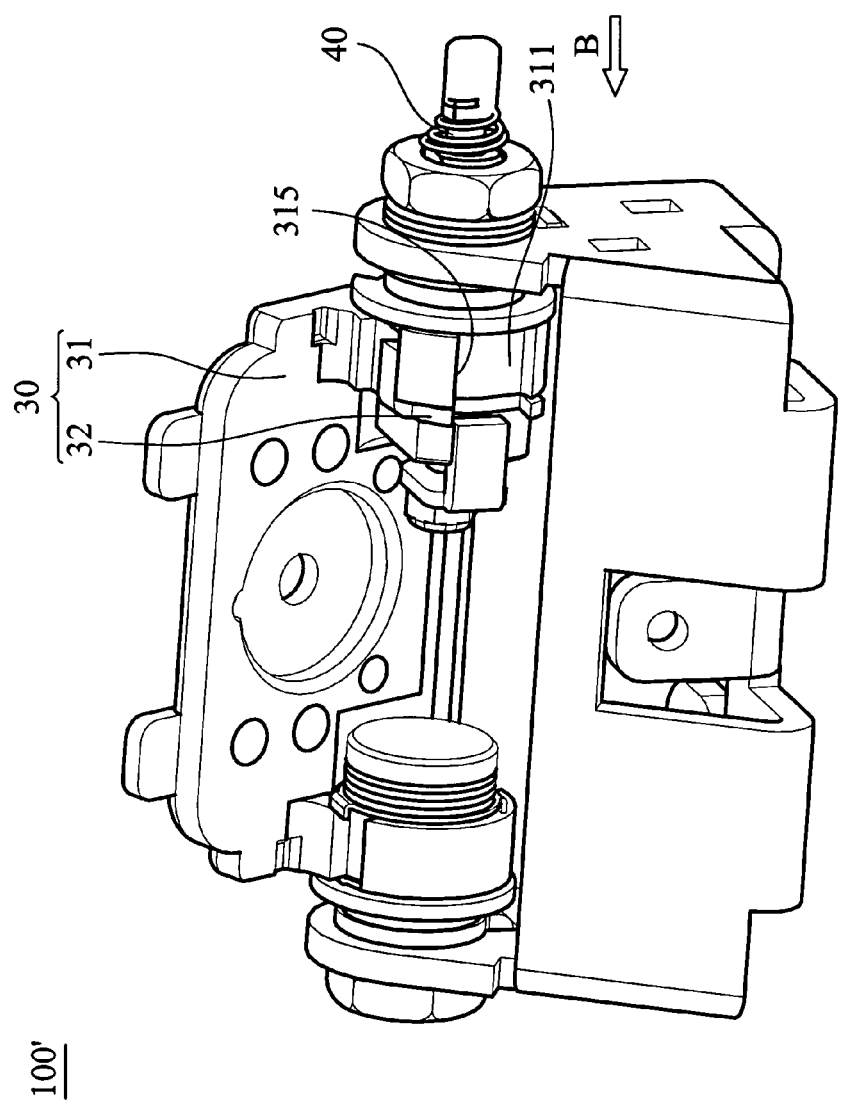
FIG. 3a is another schematic view of the rotating structure as disclosed in an embodiment of the invention, wherein the movable assembly is located in a fifth position.
Figure 3B:
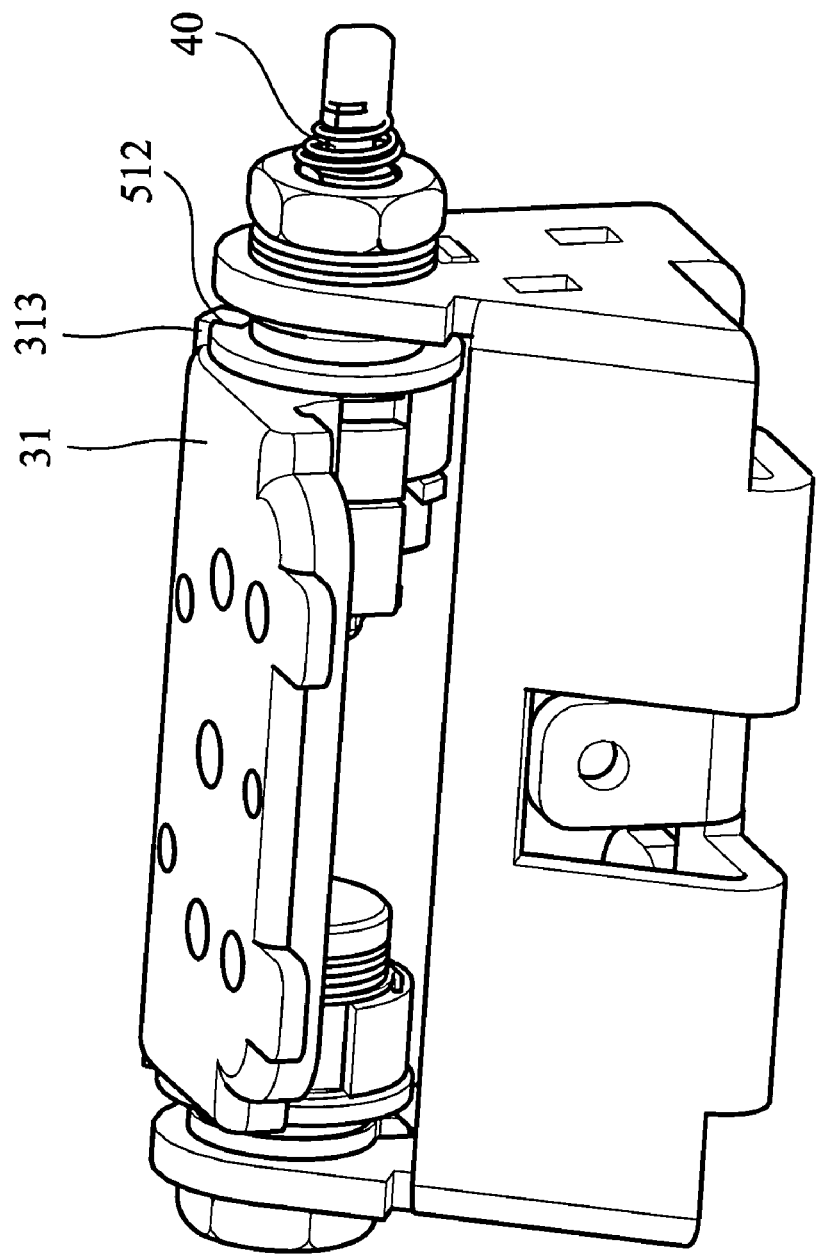
FIG. 3b is another schematic view of the rotating structure as disclosed in an embodiment of the invention, wherein the rotating assembly is located in a third position.

The rotating assembly 30 is disposed on the fixed shaft 20 and the rotary shaft 70 in a manner such that the rotating assembly 30 is rotated among a first position as shown in FIG. 2a, a second position as shown in FIG. 2b, and a third position as shown in FIG. 3b. The rotating assembly 30 comprises a rotary arm 31 and a pad 32. The rotary arm 31 is disposed on the fixed shaft 20, and comprises a second groove 311 and a third groove 312. The pad 32 is disposed on fixed shaft 20 to enhance strength, and comprises a second engaging portion 322 located in the third groove 312. Therefore, the pad 32 and the rotary arm 31 are combined to rotate simultaneously. Additionally, note that the pad 32 is located between the flange 21a and the rotary arm 31, as shown in FIG. 2a. The position of the pad 32 in FIGS. 2c and 2d is used for convenient description.

Furthermore, the second groove 311 comprises a concave portion 311a of the rotary arm 31 and a concave portion 311b of the pad 32. When the rotating assembly 30 is in the first position as shown in FIG. 2a, a first engaging portion 421 of the movable assembly 40 is abutted by a first surface 314 of the second groove 311. When the rotating assembly 30 is rotated to the second position as shown in FIG. 2b, the first engaging portion 421 of the movable assembly 40 is abutted by a second surface 315 of the second groove 311.

As shown in FIGS. 2a, 2b, 3a, and 3b, the movable assembly 40 is disposed on the fixed shaft 20 in a manner such that the movable assembly 40 is movable between a fourth position as shown in FIGS. 2a and 2b and a fifth position as shown in FIGS. 3a and 3b. The movable assembly 40 comprises a movable shaft 41, a fixed member 42, an elastic member 43, and a screw nut 44. The movable shaft 41 is disposed in the fixed shaft 20 by passing through the through hole 20b. The fixed member 42 is disposed on the movable shaft 41 via the screw nut 44. The fixed member 42 comprises a first engaging portion 421 located in the first groove 21 of the fixed shaft 20. The elastic member 43 may be a compression spring, and is disposed on the movable shaft 41 to return the movable assembly 40 to the fourth position. The screw nut 44 is combined with the movable shaft 41 to secure the fixed member 42 on the movable shaft 41.

Figure 2E:
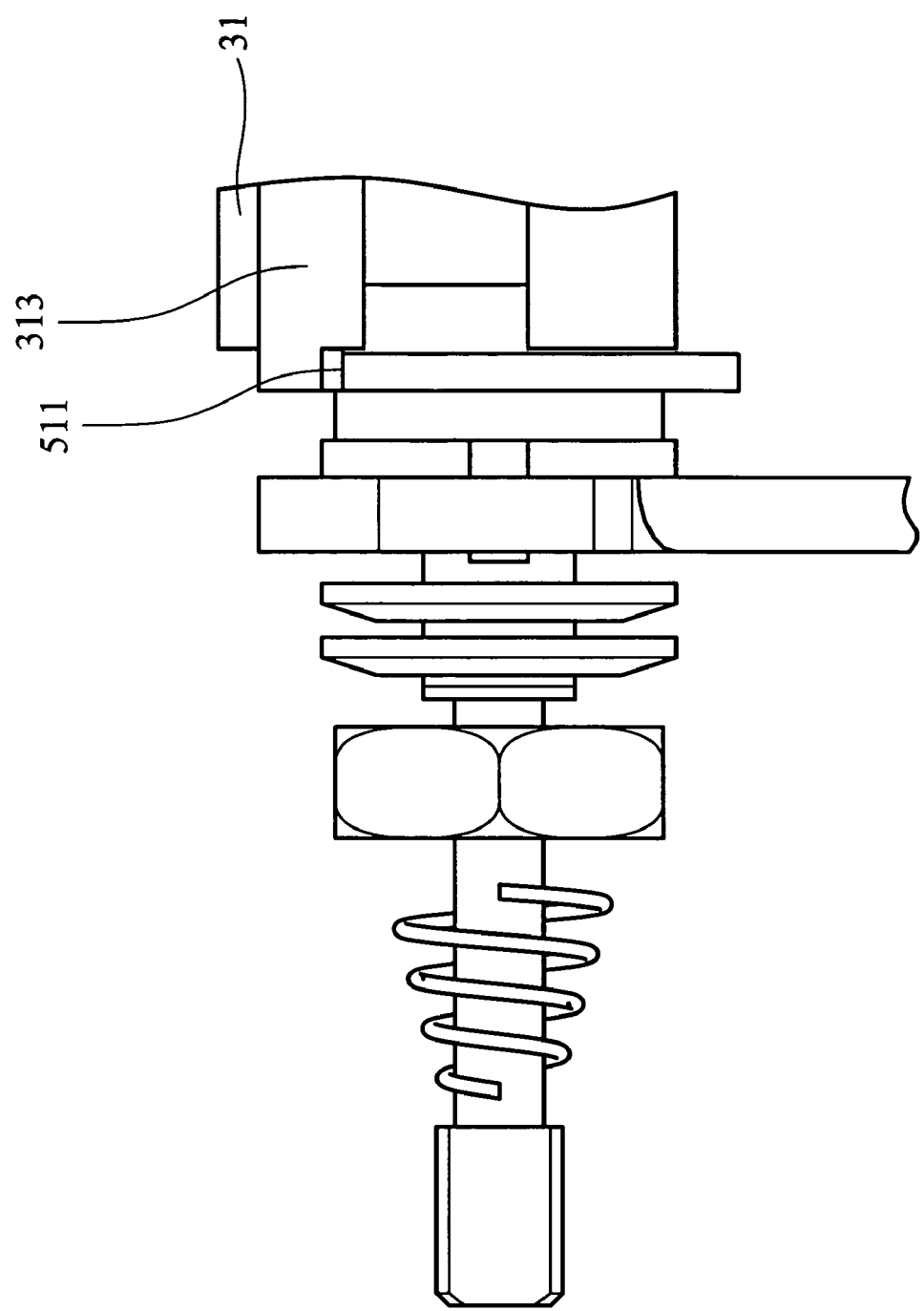

The rotary arm 31 comprises a protrusion 313. The stopper 50 comprises a notch 51, and is disposed on the fixed shaft 20 to limit the rotation of the rotating assembly 30 between the first position and the third position. Specifically, when the rotating assembly 30 is in the first position as shown in FIG. 2e, the protrusion 313 of the rotary arm 31 is abutted by a third surface 511 of the notch 51. When the rotating assembly 30 is in the third position as shown in FIG. 3b, the protrusion 313 of the rotary arm 31 is abutted by a fourth surface 512 of the notch 51.

The engaging member 60 is disposed on the fixed shaft 20, and comprises a block 60a to be combined with the base 10, thus assisting in fixing the fixed shaft 20 on the base 10. The rotary shaft 70 is disposed on the base 10, opposite to the fixed shaft 20. The rotating assembly 30 is rotatable on the rotary shaft 70.

The pads 80 are used to adjust the entire thickness of the rotating structure 100. The screw 90 fixes the pads 80 on the base 10.

When the rotating structure 100 is applied in a foldable electronic device, the base 10 is combined with a support of the electronic device, and the rotating assembly 30 is combined with a body of the electronic device. By means of the rotating structure 100, the support of the electronic device can be rotated and folded relative to the body thereof.

The operation of the rotating structure 100 is described in the following.

In a normal situation, the movable assembly 40 is in the fourth position, and the first engaging portion 421 of the fixed member 42 is in the second groove 311 of the rotating assembly 30, so that the rotating assembly 30 is limited to be rotated between the first position and the second position. To fold the electronic device, the movable shaft 41 of the movable assembly 40 is moved in a direction indicated by arrow B in FIG. 3a. At this time, the movable assembly 40 is moved to the fifth position as shown in FIG. 3b, and the first engaging portion 421 is separated from the second groove 311 so that the rotating assembly 40 can be rotated to the third position as shown in FIG. 3b. Thus, the electronic device can be folded and received, and is easily transported.

Figure 1A:
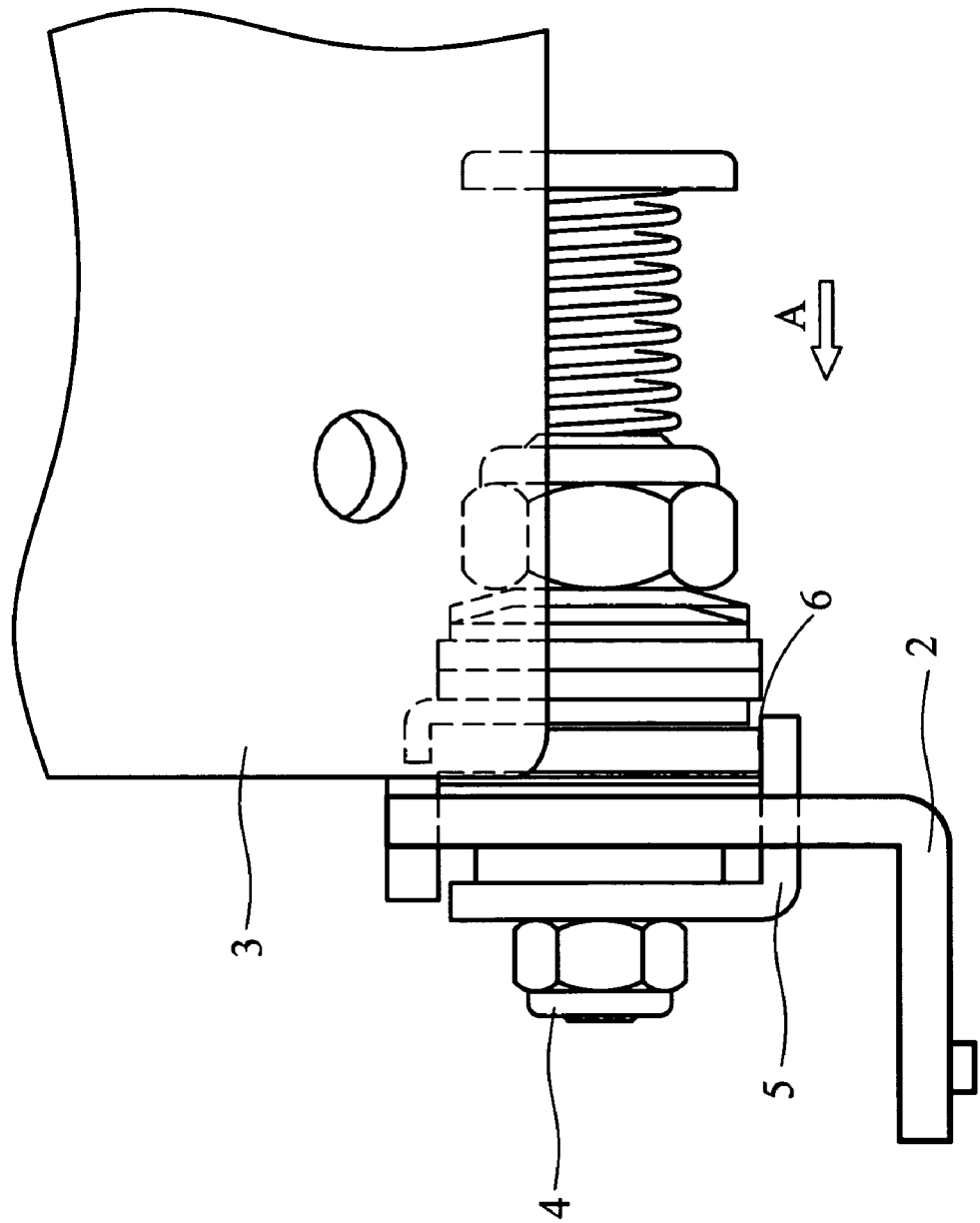
FIG. 1a is a front view of a conventional rotating structure.
Figure 1B:
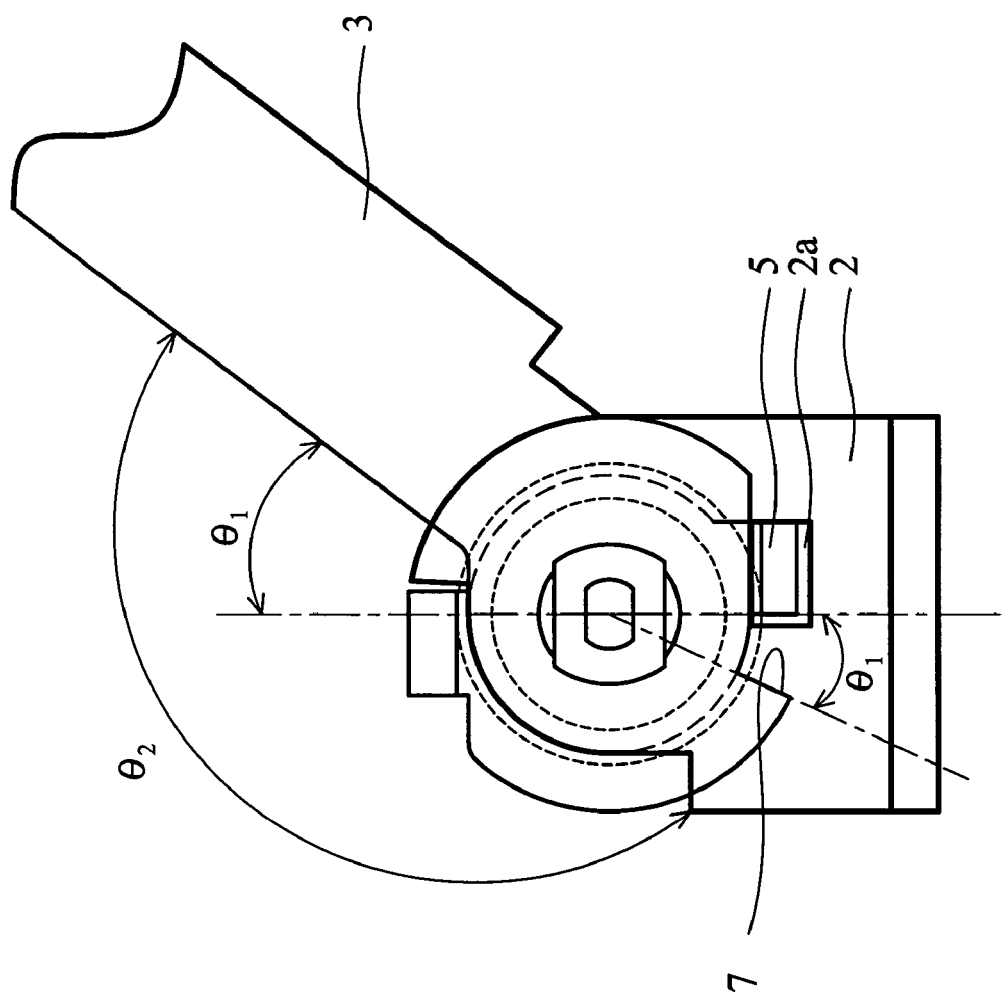
FIG. 1b is a side view of the conventional rotating structure.

As stated above, since the first groove 21 is integrally formed on the flange 21a of the fixed shaft 20, the thickness of the flange 21a can be increased. For example, compared with an iron member 7 abutting the stopper 5 in FIG. 1b, the flange 21a is thicker. Thus, damage due to unexpected shearing force to the rotating structure of an embodiment of the invention can be prevented, without increasing the volume thereof. Moreover, the volume of the rotating structure can be reduced while the flange 21a can be thickened.

In summary, the rotating structure of the invention can be disposed in a limited space while maintaining a predetermined strength.

While the invention has been described by way of example and in terms of the preferred embodiment, it is to be understood that the invention is not limited to the disclosed embodiment. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A rotating structure comprising:
    a base;
    a fixed shaft having a first groove, the fixed shaft being disposed on the base;
    a rotating assembly having a second groove, the rotating assembly being rotatably disposed on the fixed shaft among a first position, a second position, and a third position; and
    a movable assembly having a first engaging portion disposed in the first groove, the movable assembly being disposed in the fixed shaft to move between a fourth position and a fifth position;
    wherein, when the movable assembly is in the fourth position, the first engaging portion is in the second groove so that the rotating assembly is limited to being rotated between the first position and the second position; and
    wherein, when the movable assembly is in the fifth position, the first engaging portion is separated from the second groove so that the rotating assembly can be rotated to the third position.

2. The rotating structure as claimed in claim 1, wherein the rotating assembly further comprises:
   a rotary arm on which the second groove is formed, the rotary arm being disposed on the fixed shaft; and
   a pad combined with the rotary arm.

3. The rotating structure as claimed in claim 2, wherein the rotary arm has a third groove, and the pad has a second engaging portion located in the third groove so that the pad and the rotary arm are combined.

4. The rotating structure as claimed in claim 1, wherein the movable assembly further comprises:
   a movable shaft disposed in the fixed shaft; and
   a fixed member disposed on the movable shaft.

5. The rotating structure as claimed in claim 4, wherein the movable assembly further comprises an elastic member disposed on the movable shaft to return the movable assembly to the fourth position.

6. The rotating structure as claimed in claim 5, wherein the elastic member is a compression spring.

7. The rotating structure as claimed in claim 4, wherein the movable assembly further comprises a screw nut combined with the movable shaft to secure the fixed member on the movable shaft.

8. The rotating structure as claimed in claim 4, wherein the fixed shaft has a through hole, through which the movable shaft passes.

9. The rotating structure as claimed in claim 1, wherein the base has an opening combined with the fixed shaft.

10. The rotating structure as claimed in claim 1, further comprising:
    a stopper disposed on the fixed shaft to limit the rotation of the rotating assembly between the first position and the third position; and
    an engaging member disposed on the fixed shaft and combined with the base.

11. The rotating structure as claimed in claim 1, further comprising a rotary shaft disposed on the base, wherein the rotating assembly is rotated on the rotary shaft.

12. An electronic device comprising:
    a support;
    a base combined with the support;
    a fixed shaft having a first groove, the fixed shaft being disposed on the base;
    a rotating assembly, having a second groove, the rotating assembly being rotatably disposed on the fixed shaft among a first position, a second position, and a third position;
    a body combined with the rotating assembly; and
    a movable assembly, having a first engaging portion disposed in the first groove, the movable assembly being disposed in the fixed shaft to move between a fourth position and a fifth position;
    wherein, when the movable assembly is in the fourth position, the first engaging position is in the second groove so that the rotating assembly is limited to being rotated between the first position and the second position; and
    wherein, when the movable assembly is in the fifth position, the first engaging portion is separated from the second groove so that the rotating assembly can be rotated to the third position.

13. The electronic device as claimed in claim 12, wherein the rotating assembly further comprises:
    a rotary arm on which the second groove is formed, the rotary arm being disposed on the fixed shaft; and
    a pad combined with the rotary arm.

14. The electronic device as claimed in claim 13, wherein the rotary arm has a third groove, and the pad has a second engaging portion located in the third groove, so that the pad and the rotary arm are combined.

15. The electronic device as claimed in claim 12, wherein the movable assembly further comprises;
    a movable shaft disposed in the fixed shaft; and
    a fixed member disposed on the movable shaft.

16. The electronic device as claimed in claim 15, wherein the movable assembly further comprises an elastic member disposed on the movable shaft to return the movable assembly to the fourth position.

17. The electronic device as claimed in claim 16, wherein the elastic member is a compression spring.

18. The electronic device as claimed in claim 15, wherein the movable assembly further comprises a screw nut combined with the movable shaft to fix the fixed member on the movable shaft.

19. The electronic device as claimed in claim 15, wherein the fixed shaft has a through hole, through which the movable shaft passes.

20. The electronic device as claimed in claim 12, wherein the base has an opening combined with the fixed shaft.

21. The electronic device as claimed in claim 12, further comprising:
    a stopper disposed on the fixed shaft to limit the rotation of the rotating assembly between the first position and the third position; and
    an engaging member disposed on the fixed shaft and combined with the base.

22. The electronic device as claimed in claim 12, further comprising a rotary shaft disposed on the base, wherein the rotating assembly is rotated on the rotary shaft.

* * * * *